US012792750B2

(12) United States Patent
Yadav et al.

(10) Patent No.: US 12,792,750 B2
(45) Date of Patent: Nov. 10, 2026

(54) MINIMIZING DATA GOVERNANCE TO IMPROVE DATA SECURITY

(71) Applicant: Theom, Inc., San Jose, CA (US)

(72) Inventors: Navindra Yadav, Cupertino, CA (US); Supreeth Hosur Nagesh Rao, Cupertino, CA (US); Ravi Sankuratri, Cupertino, CA (US); Danesh Irani, San Carlos, CA (US); Alok Lalit Wadhwa, Milipitas, CA (US); Vasil Dochkov Yordanov, San Jose, CA (US); Venkateshu Cherukupalli, West Windsor, NJ (US); Yiwei Wang, San Jose, CA (US); Zhiwen Zhang, San Jose, CA (US); Udayan Joshi, Cupertino, CA (US)

(73) Assignee: Theom, Inc., San Jose, CA (US)

( * ) Notice: Subject to any disclaimer, the term of this patent is extended or adjusted under 35 U.S.C. 154(b) by 383 days.

(21) Appl. No.: 18/107,513

(22) Filed: Feb. 9, 2023

(65) Prior Publication Data

US 2023/0334162 A1 Oct. 19, 2023

Related U.S. Application Data

(63) Continuation-in-part of application No. 17/335,932, filed on Jun. 1, 2021, now Pat. No. 12,010,124.

(60) Provisional application No. 63/439,579, filed on Jan. 18, 2023, provisional application No. 63/153,362, filed on Feb. 24, 2021.

(51) Int. Cl.
*G06F 21/60* (2013.01)
*G06F 21/62* (2013.01)

(52) U.S. Cl.
CPC ........ *G06F 21/604* (2013.01); *G06F 21/6218* (2013.01); *G06F 2221/2113* (2013.01)

(58) Field of Classification Search
CPC ............... G06F 21/604; G06F 21/6218; G06F 2221/2113
See application file for complete search history.

(56) References Cited

U.S. PATENT DOCUMENTS

2015/0331905 A1* 11/2015 Brand ..................... H04L 63/20 707/770
2015/0370824 A1* 12/2015 Chui ....................... G06F 16/21 707/786
2017/0163677 A1* 6/2017 Gordon ............... H04L 63/1408
2021/0294797 A1* 9/2021 Gupta ................ G06F 21/6254

* cited by examiner

*Primary Examiner* — Thaddeus J Plecha

(57) ABSTRACT

In one aspect, a computerized method for minimizing a data governance in order to improve data security, comprising: providing and imposing a set of access rules to a set of data, wherein the set of data is stored in a data warehouse; measuring a level of over provisioning of the set of data; measuring a level of data abuse susceptibility of the set of data; implementing a dark data governance operation on the set of data; and identifying a set of infrequently used roles in the set of data.

20 Claims, 19 Drawing Sheets

400

500

600

700

800

900

1000

1100

1200

1400

1500

1600

MINIMIZING DATA GOVERNANCE TO IMPROVE DATA SECURITY

CLAIM OF PRIORITY

This applications claims priority to U.S. Provisional Application No. 63/439,579, filed on 18 Jan. 2023 and titled DATA STORE ANALYSIS METHODS AND SYSTEMS. This provisional application is hereby incorporated by reference in its entirety.

This application claims priority to the U.S. patent application Ser. No. 17/335,932, filed on Jun. 1, 2021 and titled METHODS AND SYSTEMS FOR PREVENTION OF VENDOR DATA ABUSE. The U.S. patent application Ser. No. 17/335,932 is hereby incorporated by reference in its entirety.

U.S. patent application Ser. No. 17/335,932 application claims priority to U.S. Provisional Patent Application No. 63/153,362, filed on 24 Feb. 2021 and titled DATA PRIVACY AND ZERO TRUST SECURITY CENTERED AROUND DATA AND ACCESS, ALONG WITH AUTOMATED POLICY GENERATION AND RISK ASSESSMENTS. This utility patent application is incorporated herein by reference in its entirety.

FIELD OF INVENTION

This application is related to data security and, more specifically, minimizing data governance to improve data security.

BACKGROUND

With data being consolidated and shared easily, it's a problem for security teams to provision the right roles, and the right permissions within a role. Additionally, Database as a Service (DBaaS) is becoming very popular in modern-day application architectures. Many applications are built directly on databases which are consumed as a service. As this consolidation onto SaaS data stores happens, many enterprises consolidate their data across business use-cases into a single SaaS Database. In such a scenario, similar to what happens when all the data is stored at the same location, multiple internal and external teams gain access. Cloud computing-based data warehousing systems (e.g., Snowflake® and/or a similar type of system) can make it very easy for sharing data within internal and external teams.

Data sharing can go wrong. Firewalls, CASBs, and CSPMs may not help with data sharing if the inherent information is misrepresented and shared with clones. Accordingly, there is a need for an approach that addresses cloning policies, keeping track of integrity, and ensuring any data created from a copy and shared is tracked to address data abuse issues. Addressing data-sharing security issues can then enable enterprises to build on new business models on third-party data and use data stores that can be shared effectively.

With respect to data warehouse security, attacks can happen from the 'front door'. Minimization-driven data governance can help drive better data security when attacks happen. Accordingly, new approaches that address data minimization workflows are desirable to improve data warehouse security.

SUMMARY OF THE INVENTION

In one aspect, a computerized method for minimizing a data governance in order to improve data security, comprising: providing and imposing a set of access rules to a set of data, wherein the set of data is stored in a data warehouse; measuring a level of over provisioning of the set of data; measuring a level of data abuse susceptibility of the set of data; implementing a dark data governance operation on the set of data; and identifying a set of infrequently used roles in the set of data.

Figure 1:
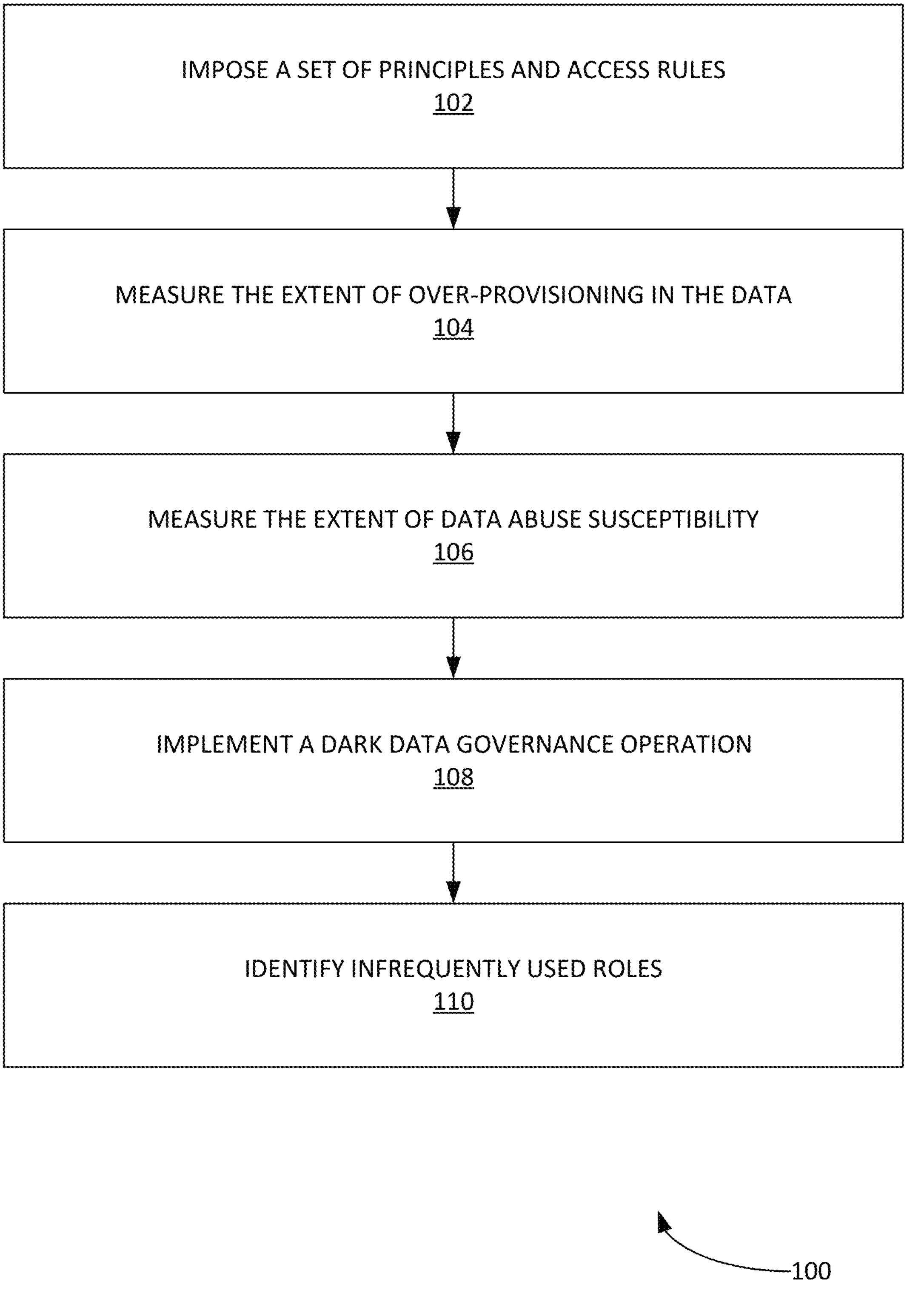
FIG. 1 illustrates an example process for minimizing data governance to improve data security, according to some embodiments.

The Figures described above are a representative set and are not exhaustive with respect to embodying the invention.

DESCRIPTION

Disclosed are a system, method, and article for minimizing data governance to improve data security. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. However, one skilled in the relevant art can recognize that the invention may be practiced without one or more of the specific details or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be a computing interface that defines interactions between multiple software intermediaries. An API can define the types of calls and/or requests that can be made, how to make them, the data formats that should be used, the conventions to follow, etc. An API can also provide extension mechanisms so that users can extend existing functionality in various ways and to varying degrees.

Cloud computing is the on-demand availability of computer system resources, especially data storage (e.g. cloud storage) and computing power, without direct active management by the user.

Cloud database is a database that typically runs on a cloud computing platform and access to the database is provided as-a-service.

Cloud storage is a model of computer data storage in which the digital data is stored in logical pools, said to be on "the cloud". The physical storage spans multiple servers (e.g. in multiple locations), and the physical environment is typically owned and managed by a hosting company. These cloud storage providers can keep the data available and accessible, and the physical environment secured, protected, and running.

Column can be a set of data values of a particular type, one value for each row of the database.

Dark data is data which is acquired through various computer network operations but not used in any manner to derive insights or for decision making.

Data cloning creates a copy of data asset/set for backup, analysis, and/or other purposes.

Data warehouse can be a system used for reporting and data analysis and is considered a core component of business intelligence.

Principle of least privilege (PoLP) provides that in a particular abstraction layer of a computing environment, every module (e.g. a process, a user, or a program, depending on the subject) is to be able to access only the information and resources that are necessary for its legitimate purpose.

Shadow data can be any data that is not organized by or subject to an entity's data management system.

Software as a service (SaaS) is a software licensing and delivery model in which software is licensed on a subscription basis and is centrally hosted.

Virtual private cloud (VPC) can be an on-demand configurable pool of shared resources allocated within a public cloud environment, providing a certain level of isolation between the different organizations using the resources.

These definitions are provided by way of example and not of limitation.

Example Methods

FIG. 1 illustrates an example process 100 for minimizing data governance to improve data security, according to some embodiments. In step 102, process 100 imposes a set of principles and access rules. Rules can stipulate that only specific roles say X, can access clear text data as long as data does not have PII and is not exposed publicly. Another example could be only role Y can create clones as long as data does not have developer keys. This step can include process 200.

Figure 2:
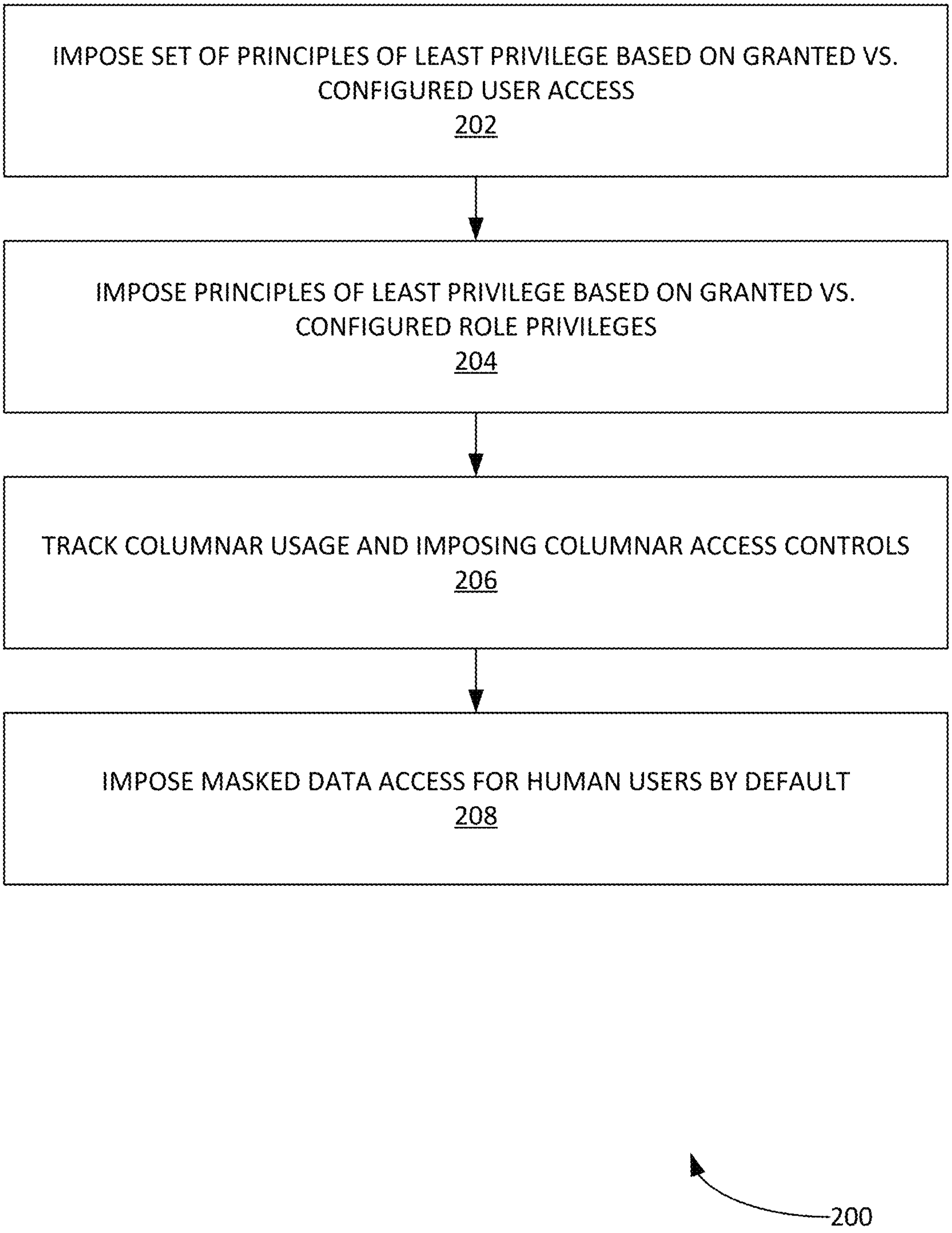
FIG. 2 illustrates an example process for imposing a set of principles and access rules, according to some embodiments.

FIG. 2 illustrates an example process 200 for imposing a set of principles and access rules, according to some embodiments. In step 202, process 200 imposes a set of principles of least privilege based on granted versus configured user access. In step 204, process 100 imposes principles of least privilege based on granted versus configured role privileges. In step 206, process 200 tracks columnar usage and imposing columnar access controls. In step 208, process 200 imposes masked data access for human users by default.

Returning to process 100, in step 104, process 100 measures the extent of over-provisioning in the data. In step 106, process 100 measures the extent of data abuse susceptibility. When there are over-provisioned users and roles, it opens up an attack surface that can be exploited. If users have access to assets they do not use or do not need access, it becomes an invitation for abuse. In step 108, process 100 implements a dark data governance operation. Every enterprise has data that is not accessed for a long time. When such data is not governed right and exposed externally it can create an attack vector that can be avoided. This can be include removing accesses to dark data/quarantine until a delete. In step 110, process 100 identifies infrequently used roles. Roles that are created but never assigned to any users are an attack surface for data warehouses. These roles represent an attack tactic for abuse of admin rights or when an admin/user with "assume" role privileges is phished or social engineered.

Figure 3:
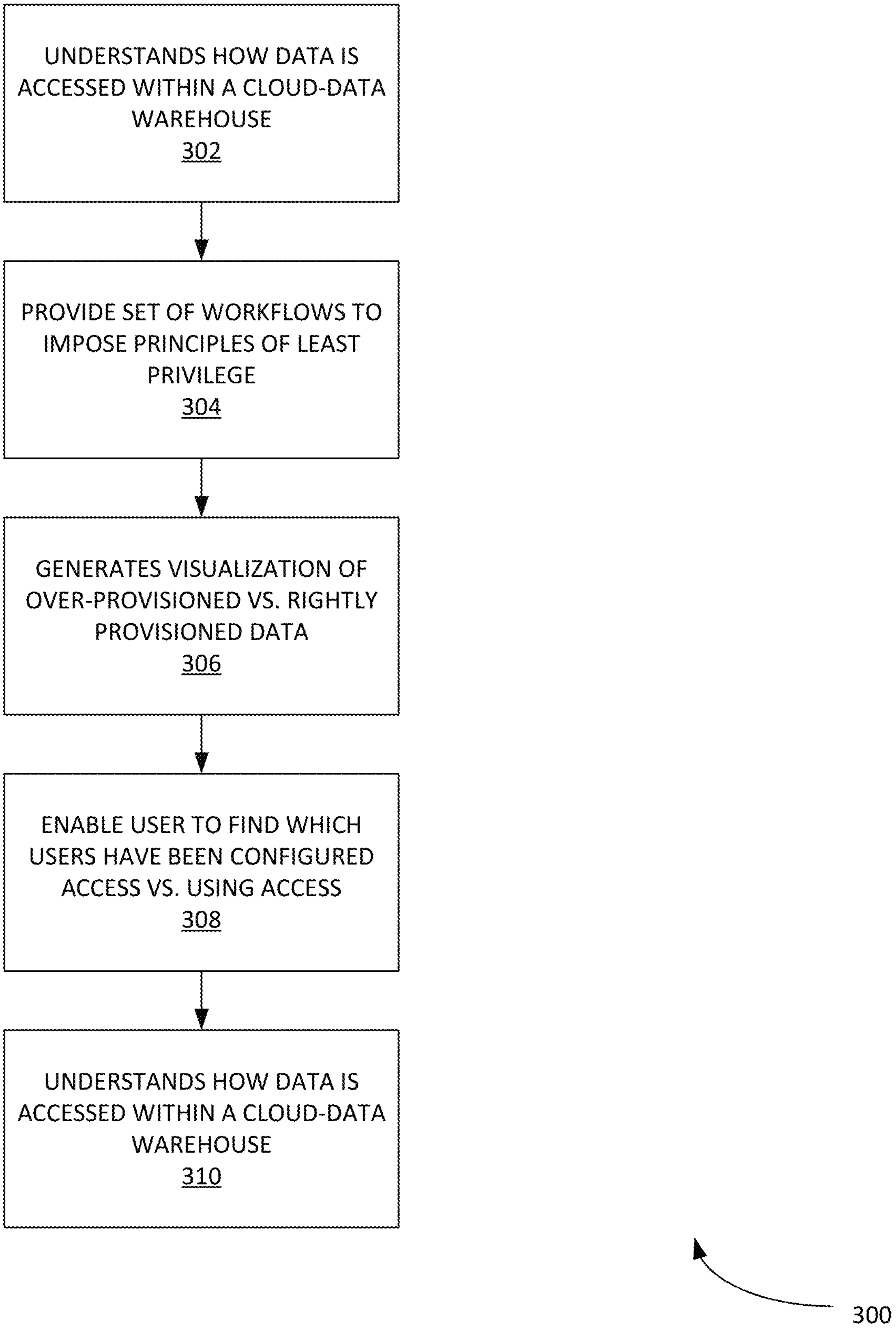
FIG. 3 illustrates an example process for minimizing data governance to improve data security in a data warehouse, according to some embodiments.

FIG. 3 illustrates an example process 300 for minimizing data governance to improve data security in a data warehouse, according to some embodiments. The data warehouse can be a cloud-data warehouse (e.g. a data warehouse implemented in one or more cloud-computing systems, i.e. a 'cloud warehouse', etc.). Example data warehouses can be cloud computing-based data entities (e.g. Snowflake®, Databricks®, etc.).

Figure 4:
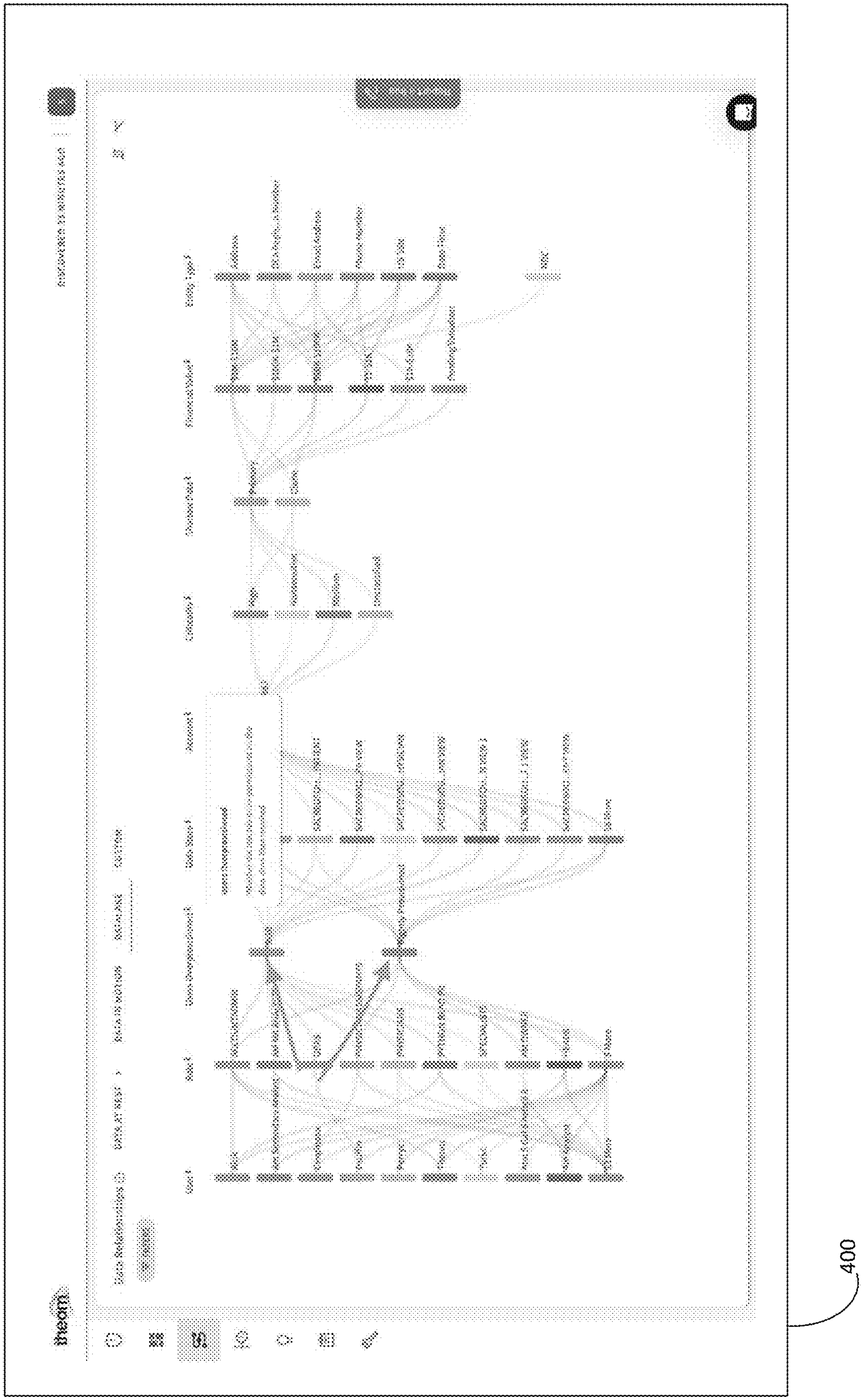
FIG. 4 illustrates an example screen shot showing a visualization of users that are over-provisioned versus rightly provisioned, according to some embodiments.

In step 302, process 300 understands how data is accessed within a cloud-data warehouse. With this understanding, in step 304, process 300 generates and provides a set of workflows to impose principles of least privilege. In step 306, process 300 generates a visualization of over-provisioned versus rightly provisioned data with the cloud-data warehouse. FIG. 4 illustrates an example screen shot 400 showing a visualization of users that are over-provisioned versus rightly provisioned, according to some embodiments.

In step 308, process 300 enables a user to find which users have been configured access versus using access to the data in the cloud-data warehouse. Configured Users can access a data asset on the cloud-data warehouse.

Figure 5:
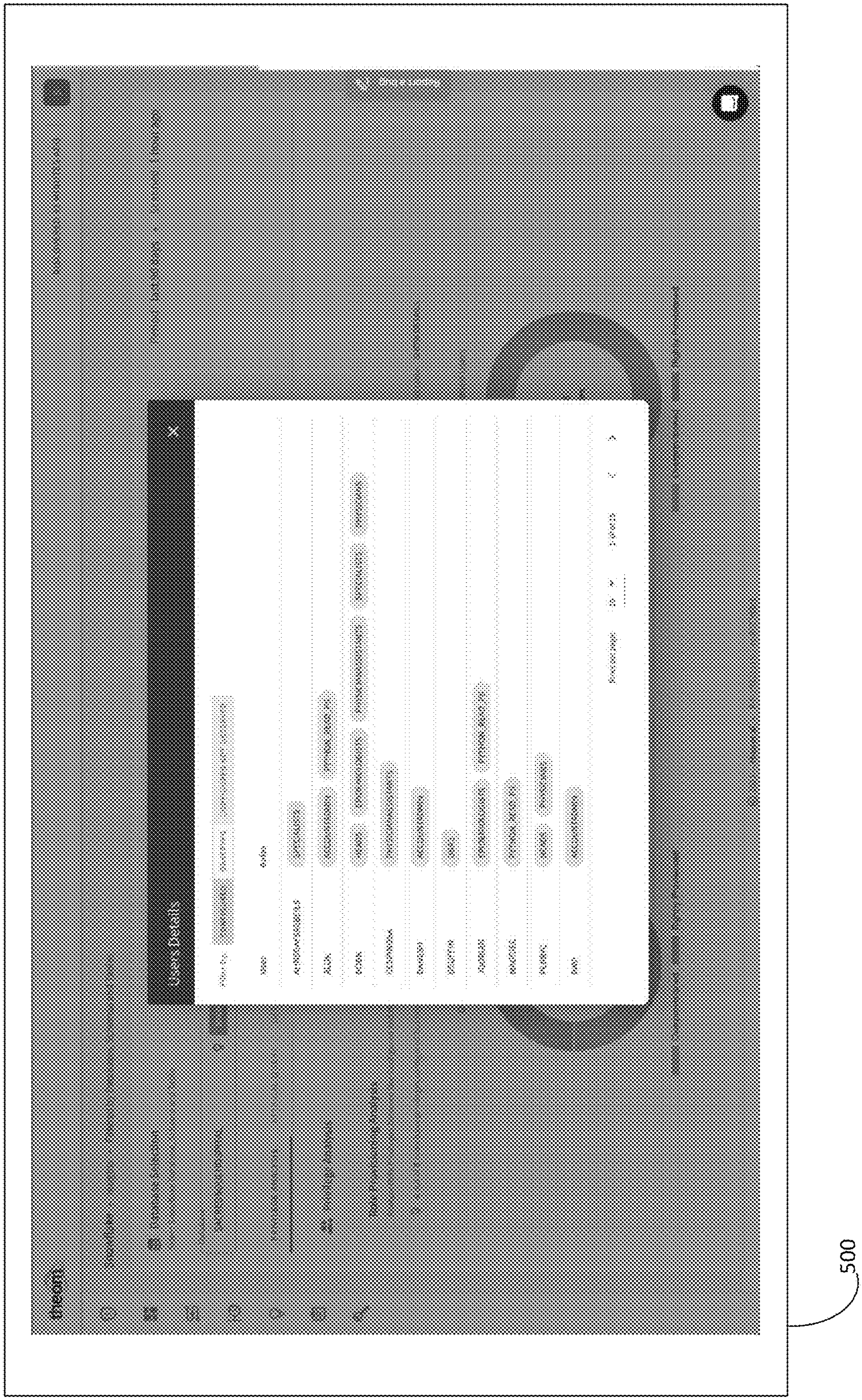
FIG. 5 illustrates an example screenshot showing graphical elements enabling access to a list of configured users, according to some embodiments.
Figure 6:
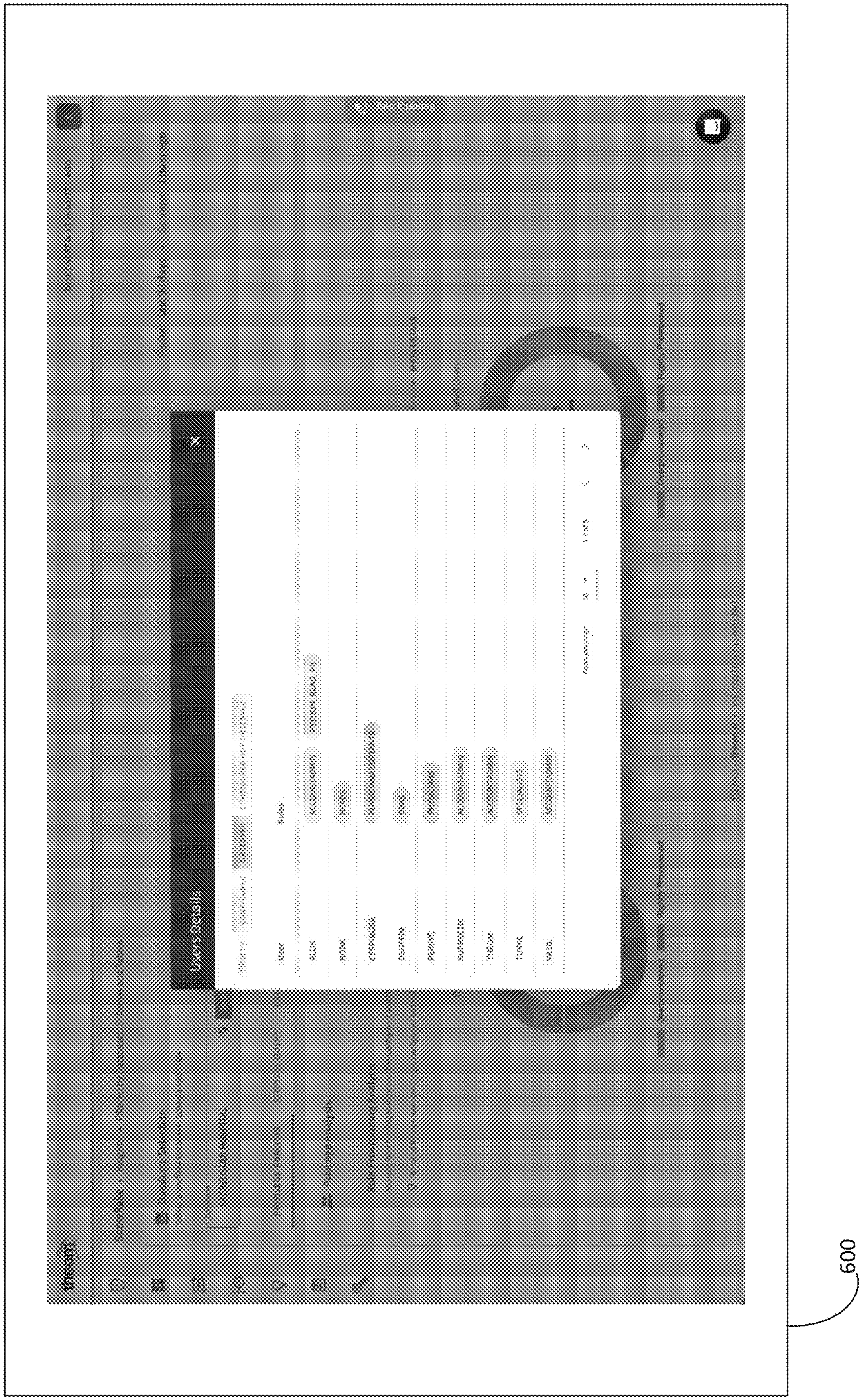
FIG. 6 illustrates an example screenshot showing observed users who are using a data asset on the cloud warehouse, according to some embodiments.
Figure 7:
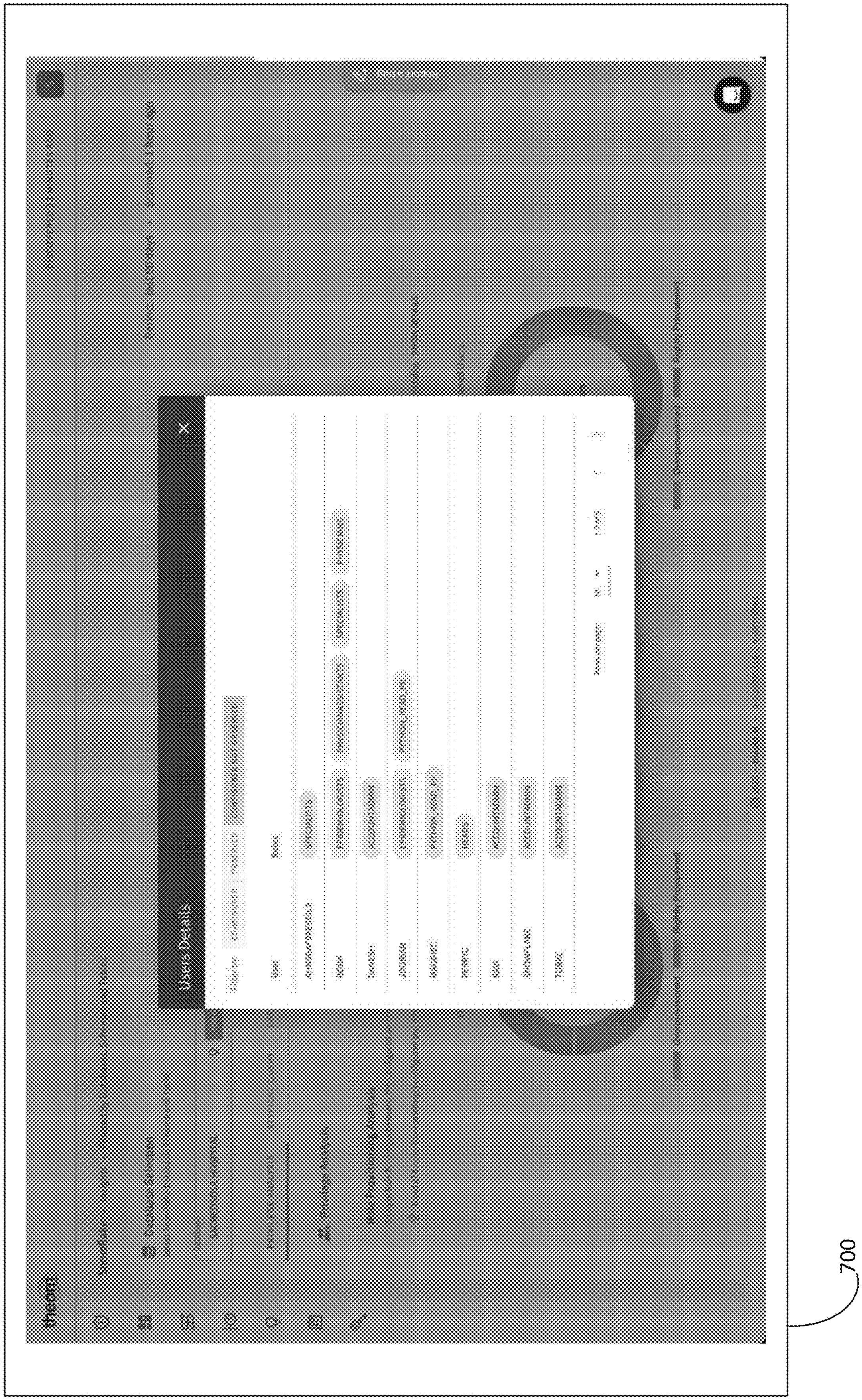
FIG. 7 illustrates an example screenshot showing a set of configured but not observed users, according to some embodiments.

FIG. 5 illustrates an example screenshot 500 showing graphical elements enabling access to a list of configured users, according to some embodiments. FIG. 6 illustrates an example screenshot 600 showing observed users who are using a data asset on the cloud warehouse, according to some embodiments. FIG. 7 illustrates an example screenshot 700 showing a set of configured but not observed users, according to some embodiments.

Figure 8:
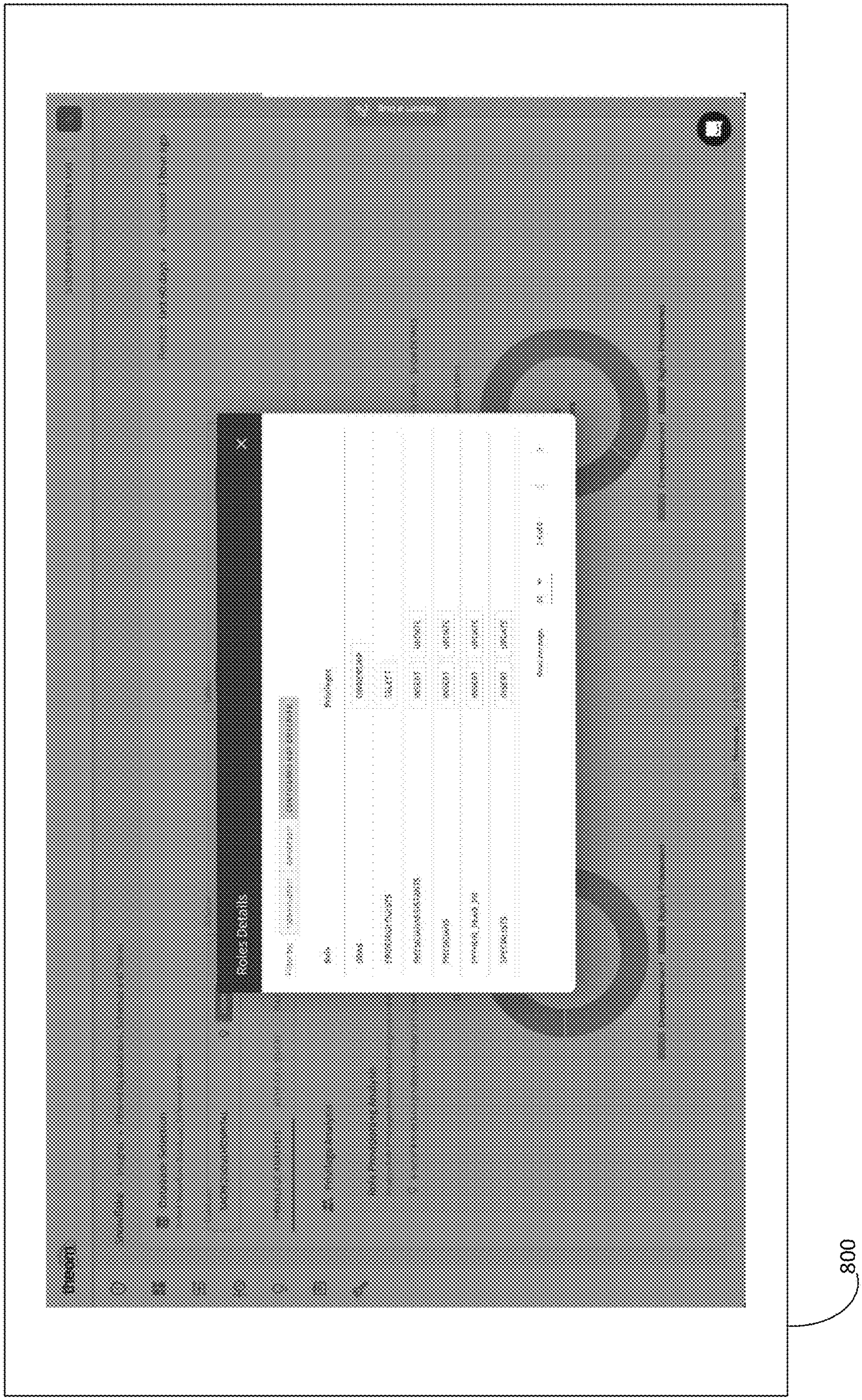
FIG. 8 illustrates an example screenshot showing a set of configured roles that are not using all the privileges, according to some embodiments.

In step 310, process 300 enables a user find which roles are using all the privileges attached versus the roles that are not using all the privileges. FIG. 8 illustrates an example screenshot 800 showing a set of configured roles that are not using all the privileges, according to some embodiments.

Figure 9:
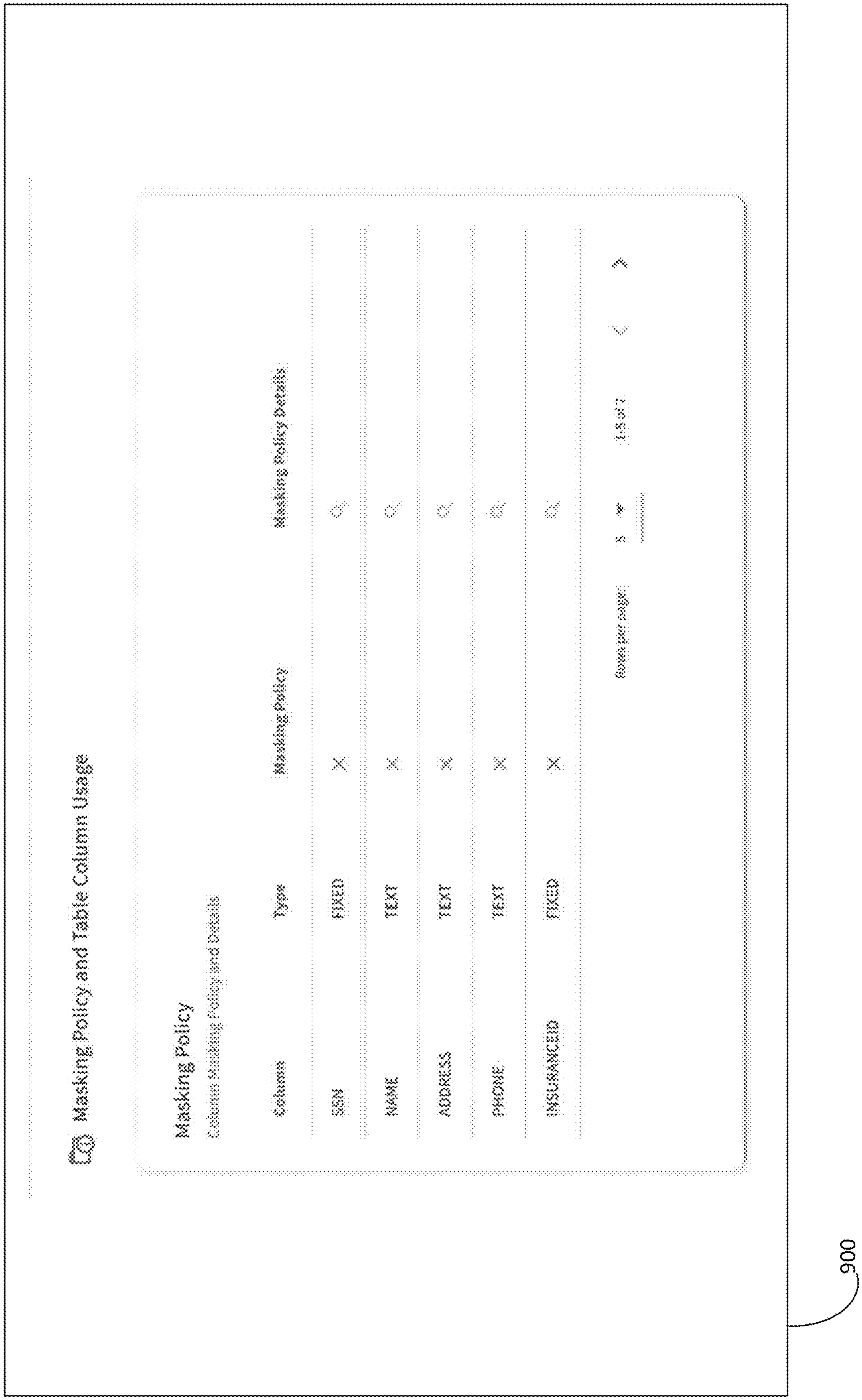
FIGS. 9-10 illustrates an example screenshots showing columnar usage based on the roles, according to some embodiments.
Figure 10:
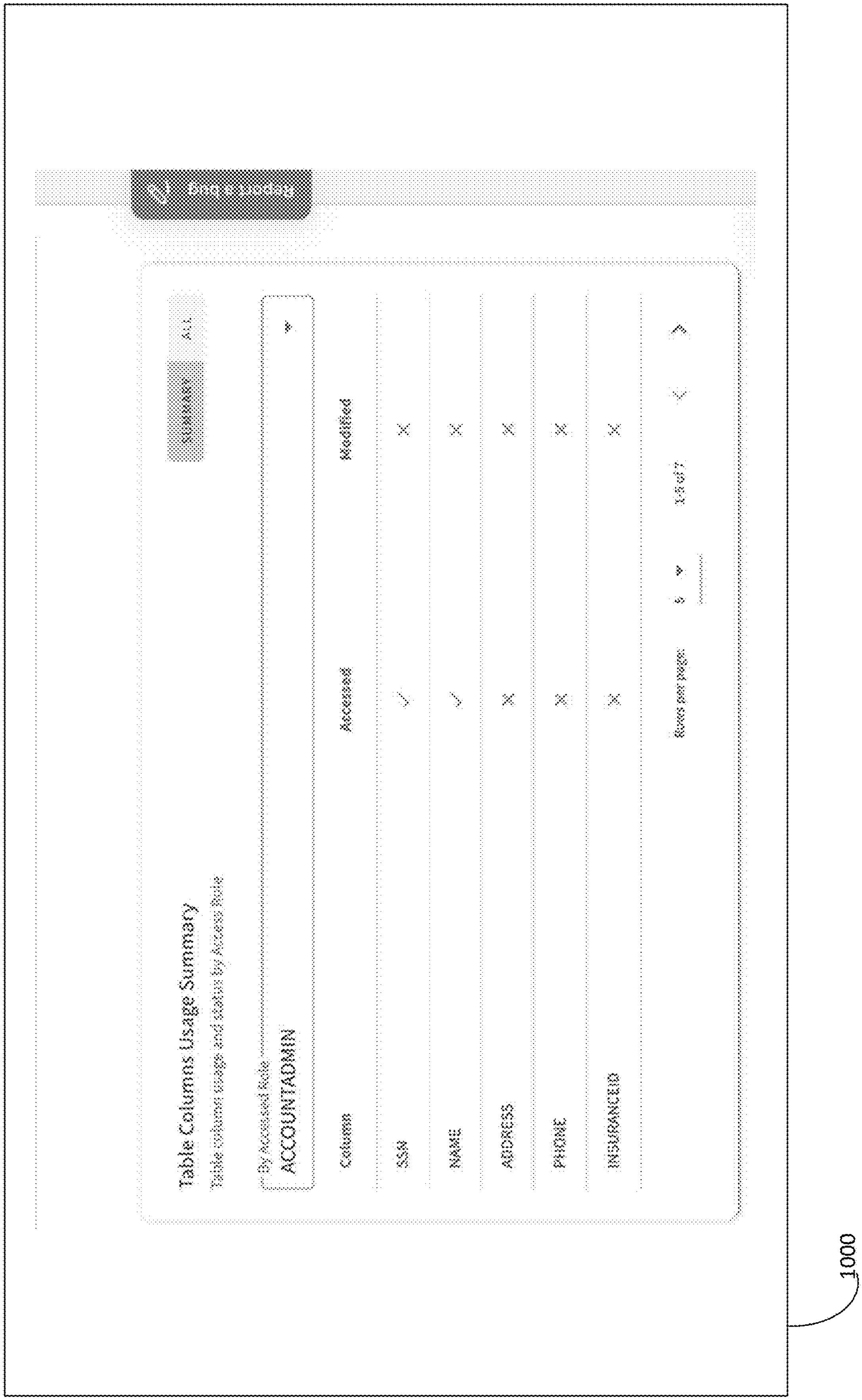

In step 312, process 300 enables enterprises to track which users access the specific columns within the data assets. This can include columnar usage based on the user roles. FIGS. 9-10 illustrates an example screenshots 900-1000 showing columnar usage based on the roles, according to some embodiments.

Figure 11:
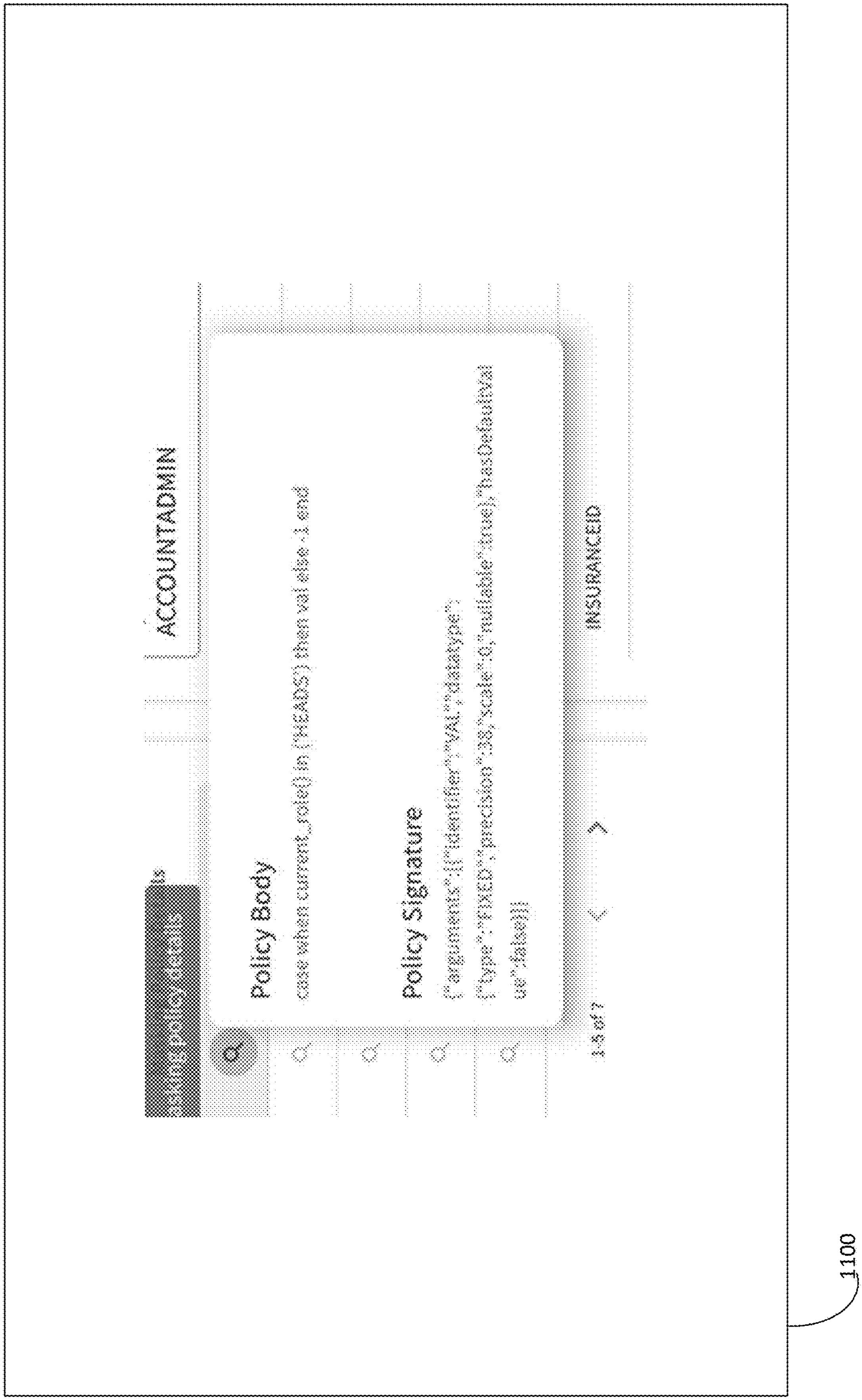
FIGS. 11-13 illustrates an example screenshots showing a masking policy and table column usage, according to some embodiments.
Figure 12:
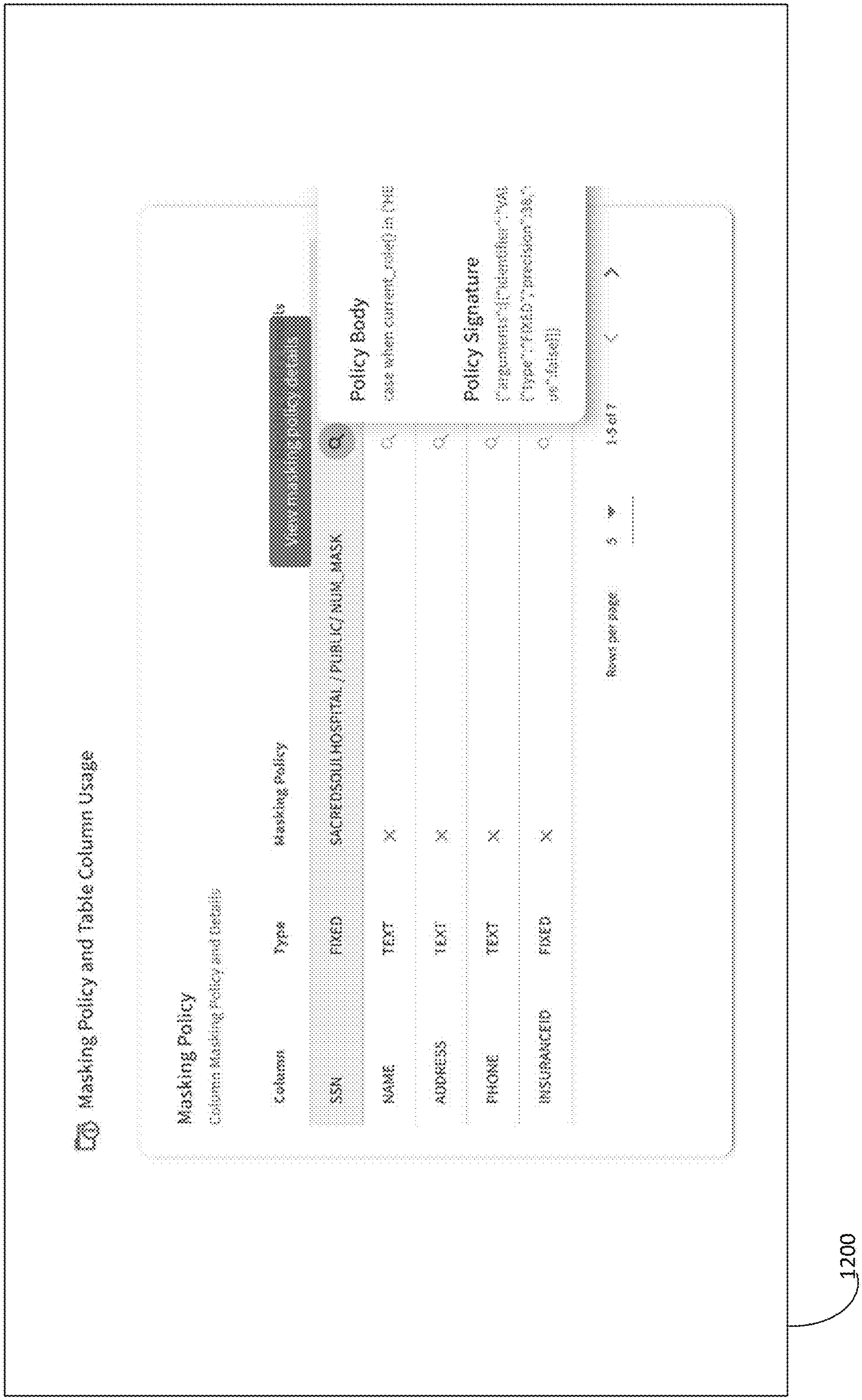
Figure 13:
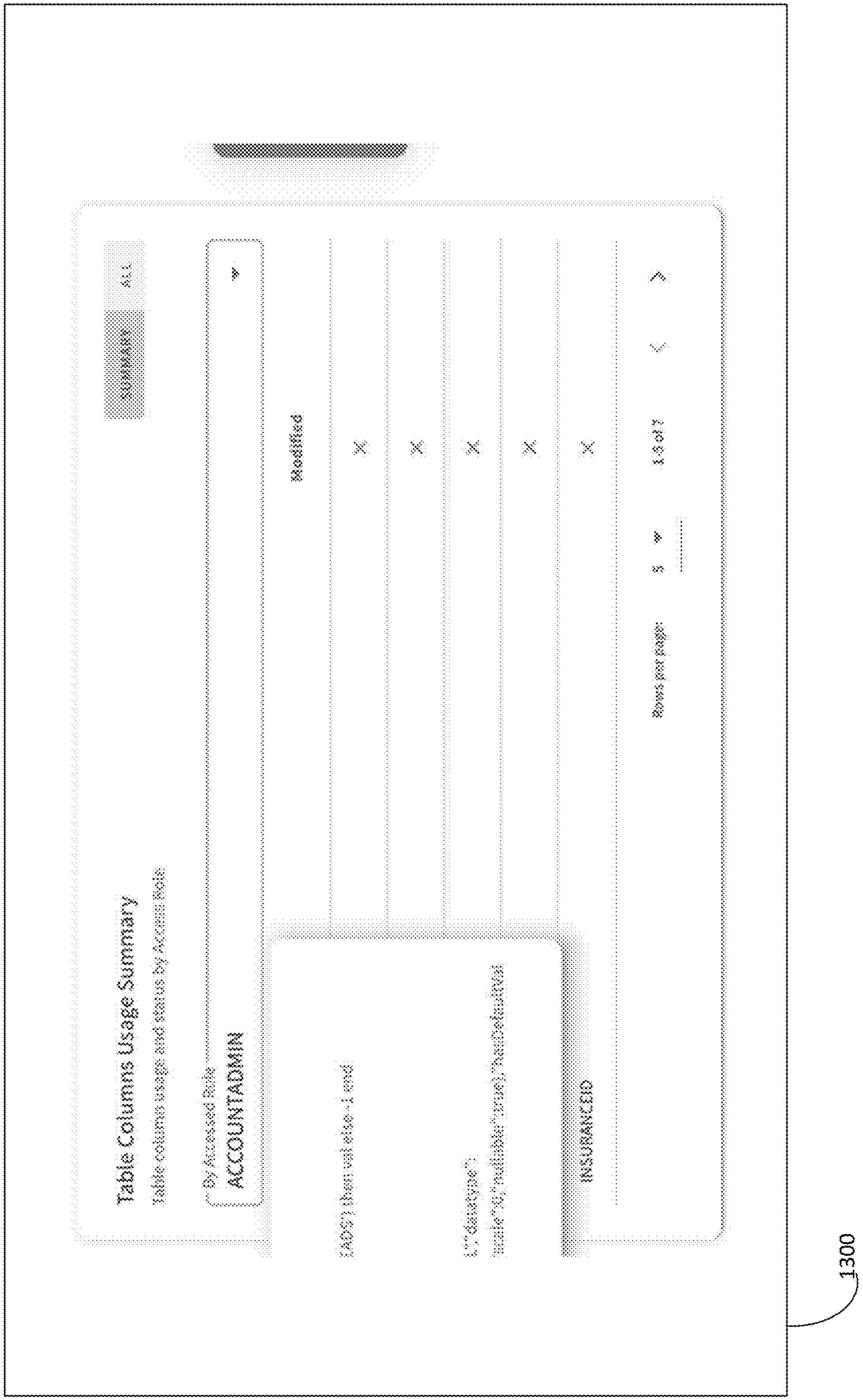
Figure 18:
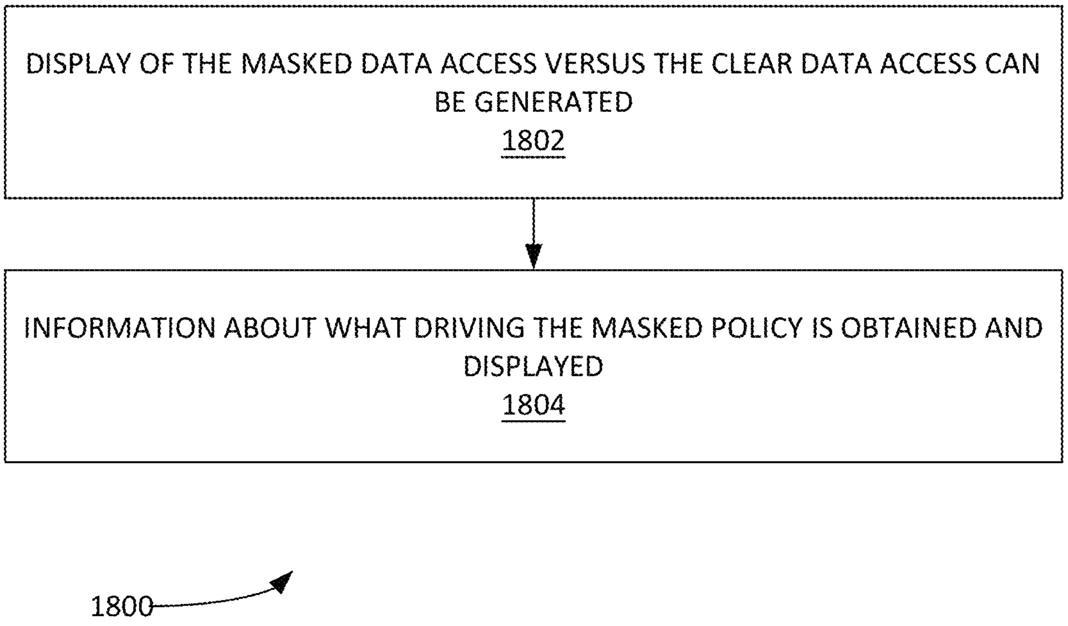
FIG. 18 illustrates an example process for accessing data as a masked or a clear text data asset, according to some embodiments.

In step 314, process 300 can enable enterprises to address whether the data is being accessed as a masked or a clear text data asset. FIG. 18 illustrates an example process 1800 for accessing data as a masked or a clear text data asset, according to some embodiments. In step 1802, process 1800 can display of the masked data access versus the clear data access can be generated. Information about what driving the masked policy can be obtained and displayed as well in step 1804. FIGS. 11-13 illustrates an example screenshots 1100-1300 showing a masking policy and table column usage, according to some embodiments.

In step 316, process 300 can incorporate minimization principles to create to implement data access governance. Principles can include the following, inter alia:

- A way to impose principles of least privilege based on granted vs. configured user access;
- A way to impose principles of least privilege based on granted vs. configured role privileges;
- Tracking columnar usage and imposing columnar access controls;
- Remove accesses to dark data/quarantine until deleted;
- Identify and address infrequent roles; and
- Impose masked data access for human users by default.

Figure 14:
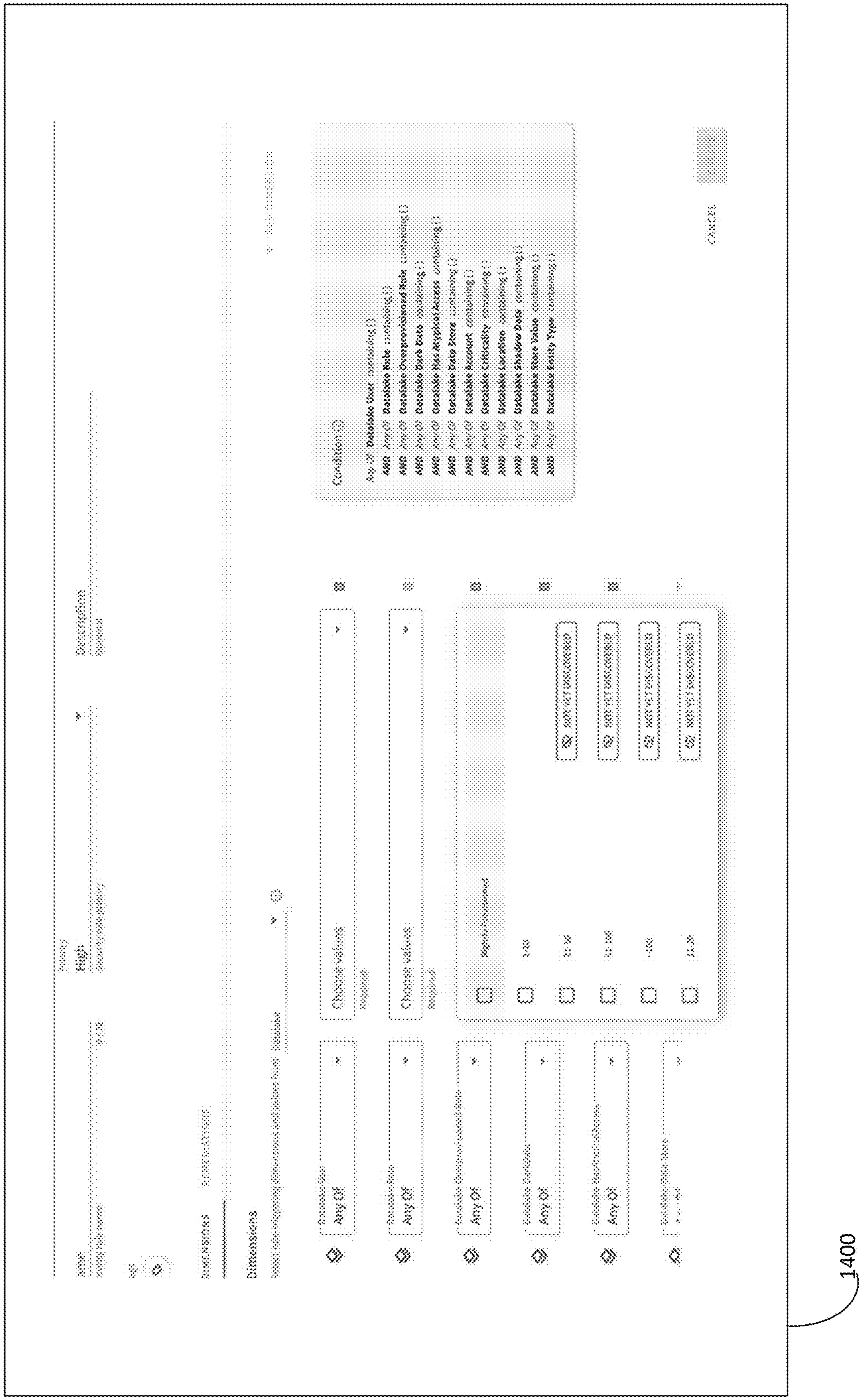
FIG. 14 illustrates a screenshot illustrating a user interface for creating security rules in the data warehouse, according to some embodiments.

FIG. 14 illustrates a screenshot 1400 illustrating a user interface for creating security rules in the data warehouse, according to some embodiments.

For example, rule attributes and predicates can be created based on dark or shadow data. Rule attributes and predicates can be created based on the degree of over-provisioning with the data warehouse.

Figure 15:
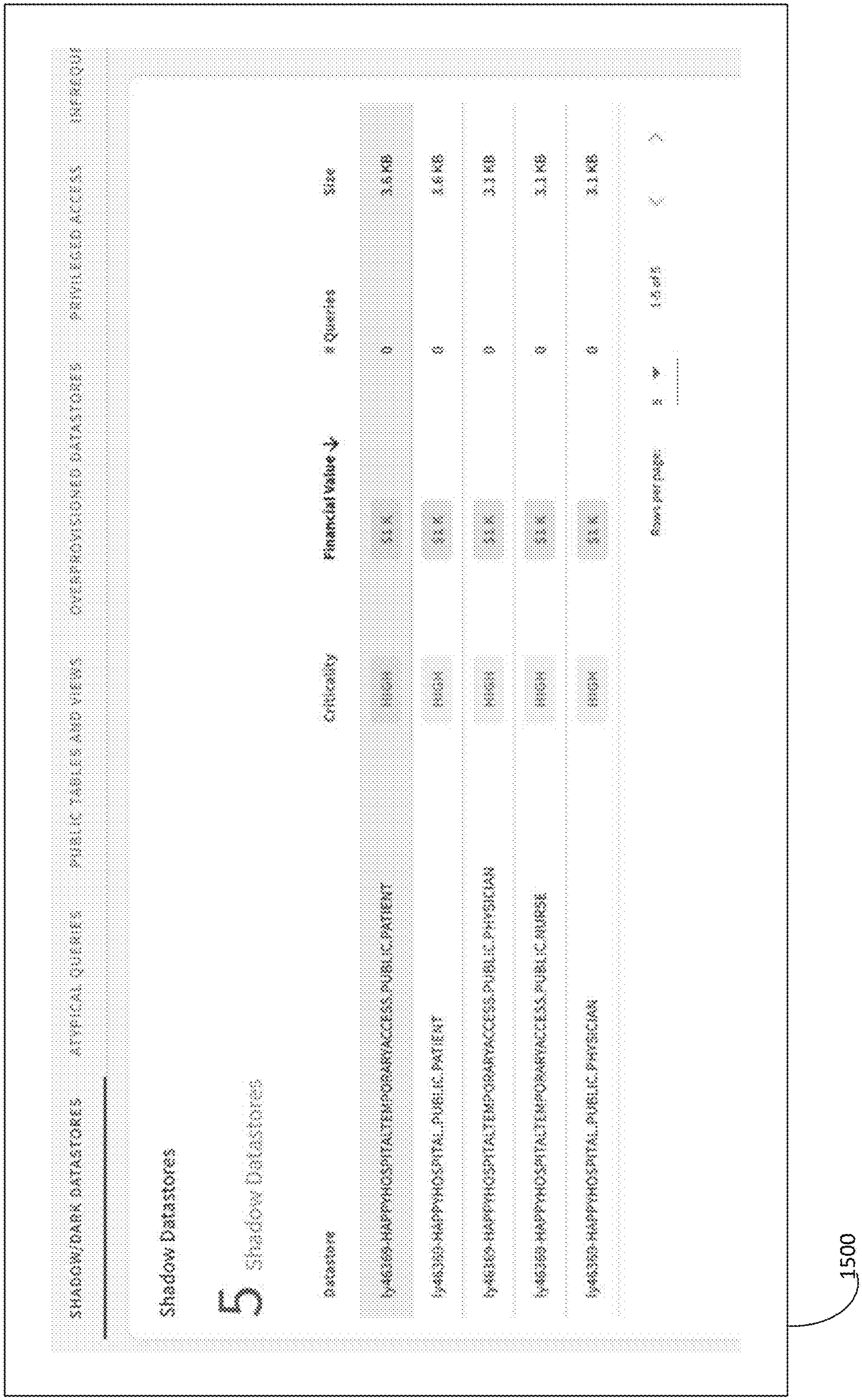
FIGS. 15-16 illustrates an example screenshots showing an interface used to track shadow and dark data, according to some embodiments.
Figure 16:
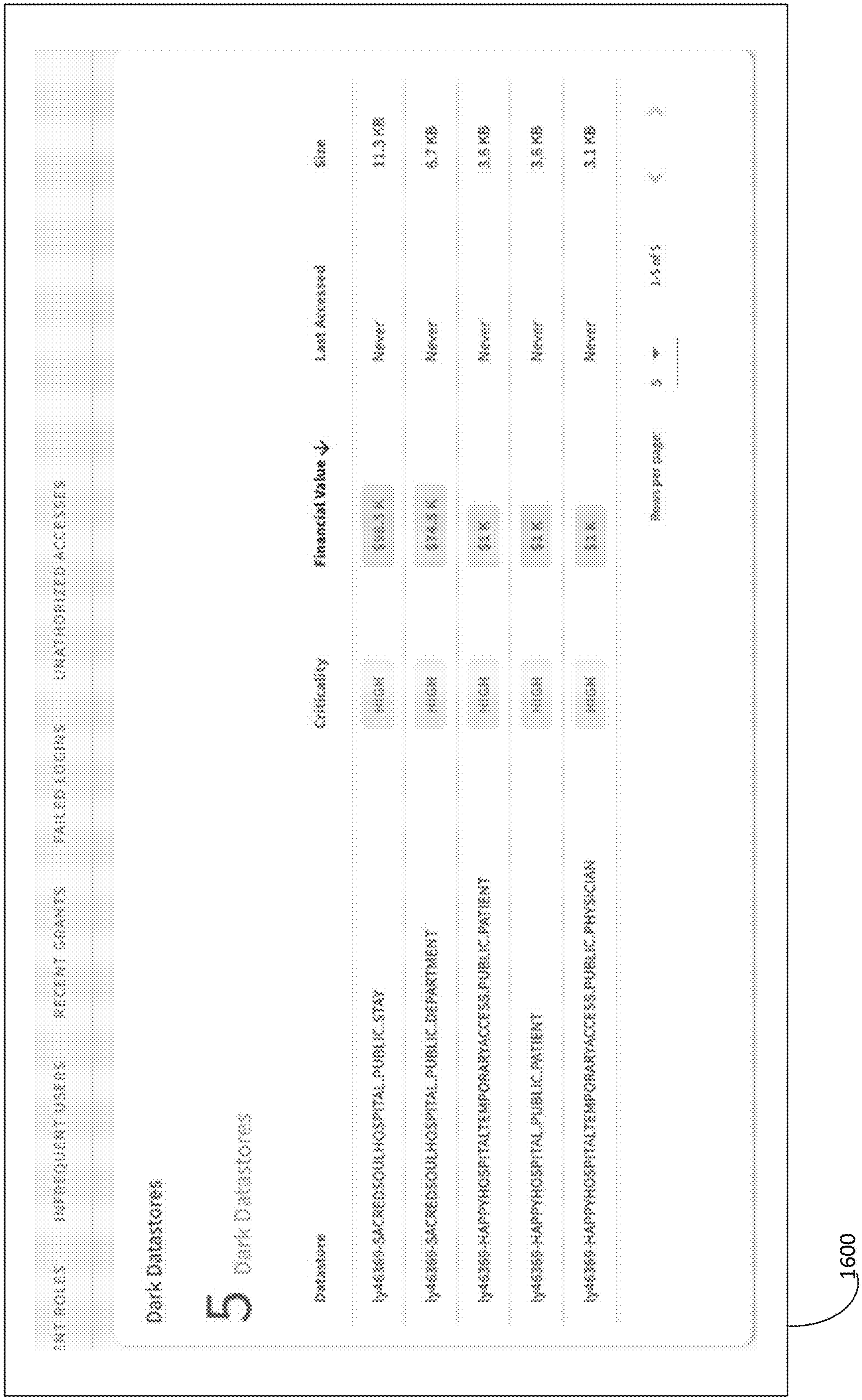
Figure 17:
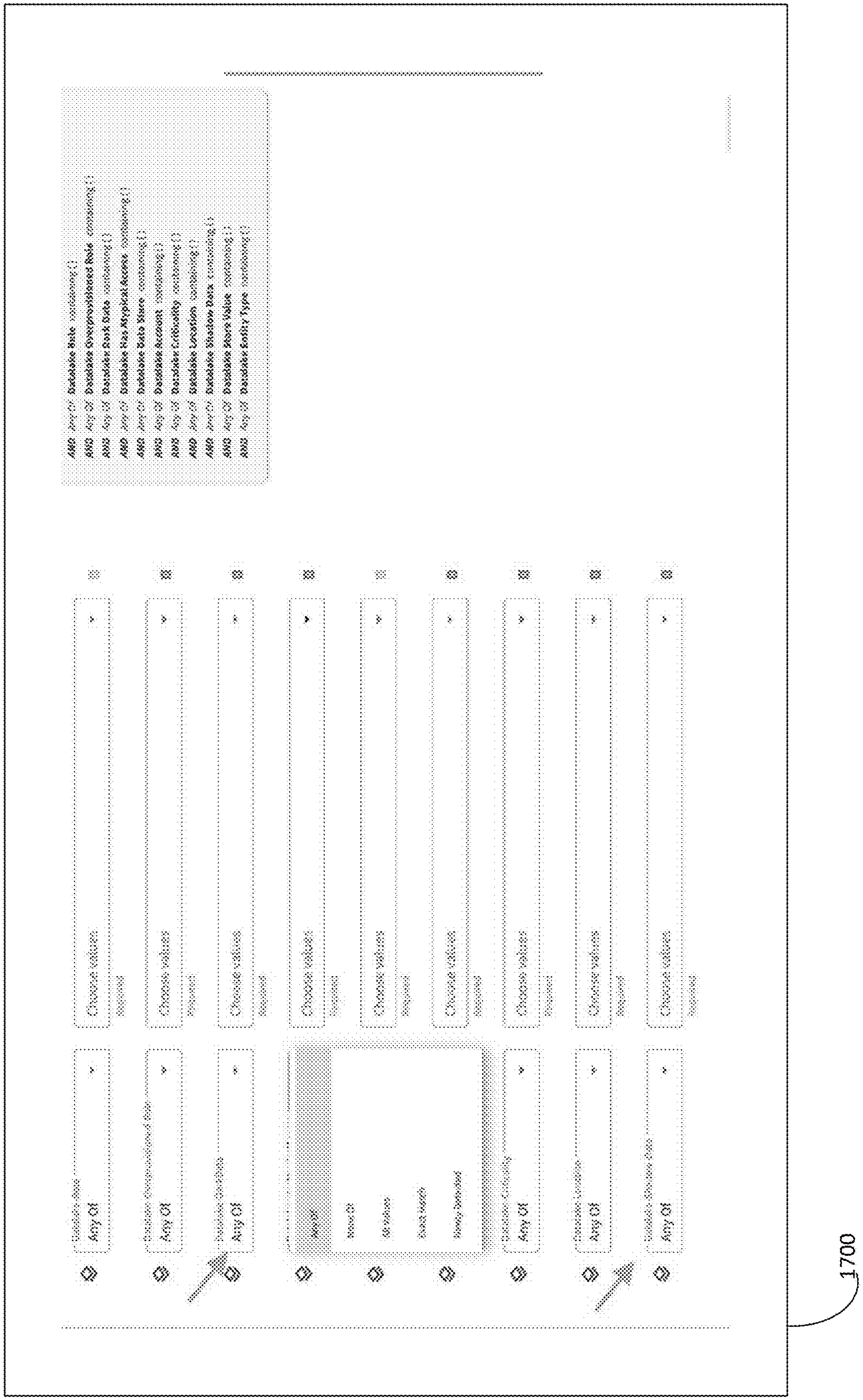
FIG. 17 illustrates an example screen shot showing an interface that uses shadow and dark data as attributes in governance, according to some embodiments.

Process 300 can use shadow and/or dark data as properties to govern access. Shadow data can be defined as a data asset that was copied from another source asset, however, the cloned copy deviated from the original in terms of security posture or access. Dark data is defined as a set of data stores that have not been accessed for fixed periods. These represent attack surfaces that can be eliminated as the data has never been accessed. Dark data can be defined as data not accessed for a period of the time period of one hundred and eighty (180) days. However, this can be configurable. FIGS. 15-16 illustrates an example screenshots 1500-1600 showing an interface used to track shadow and dark data, according to some embodiments. FIG. 17 illustrates an example screen shot 1700 showing an interface that uses shadow and dark data as attributes in governance, according to some embodiments.

Additional Computing Systems

Figure 19:
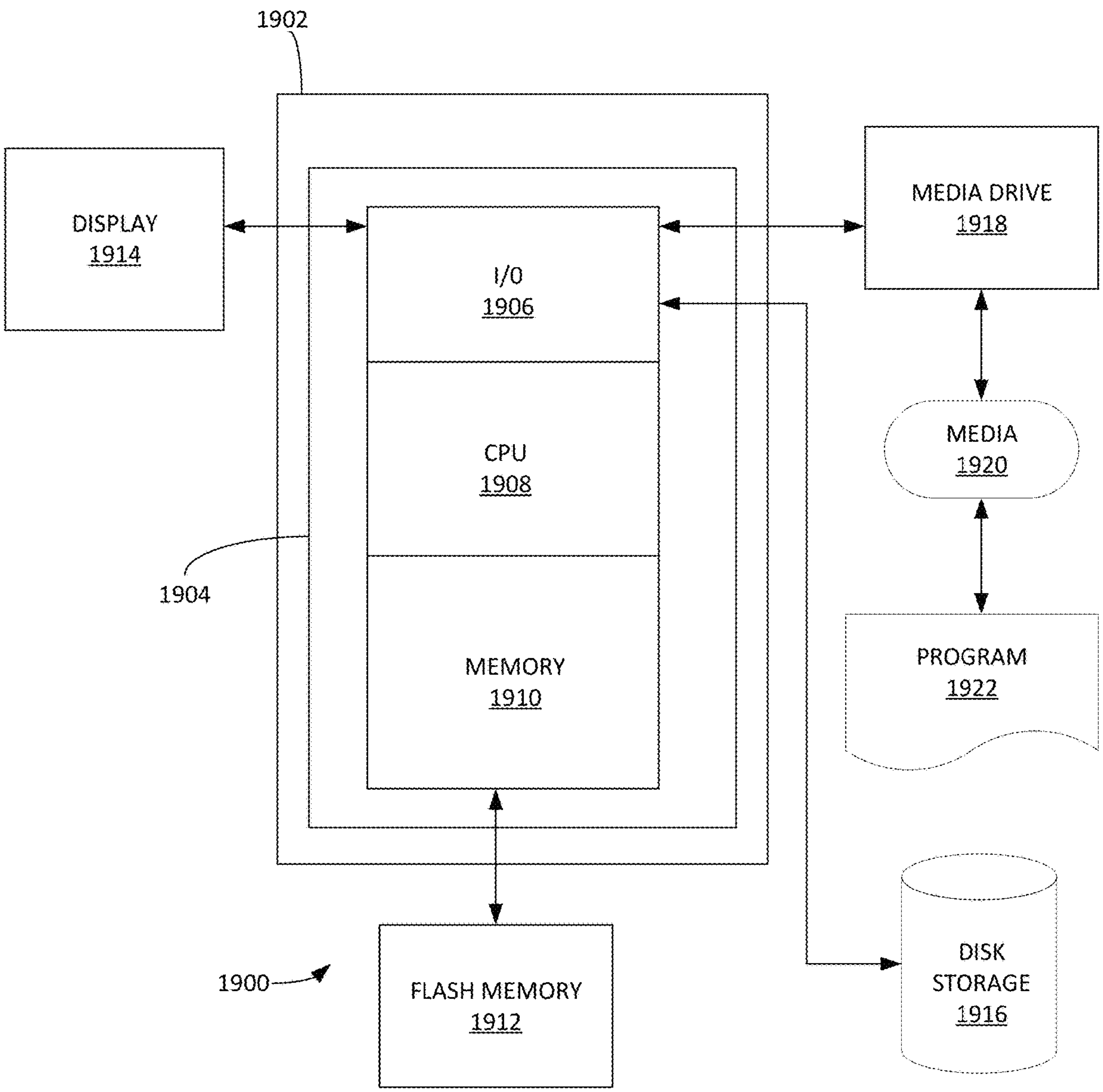
FIG. 19 depicts an exemplary computing system that can be configured to perform any one of the processes provided herein.

FIG. 19 depicts an exemplary computing system 1900 that can be configured to perform any one of the processes provided herein. In this context, computing system 1900 may include, for example, a processor, memory, storage, and I/O devices (e.g., monitor, keyboard, disk drive, Internet connection, etc.). However, computing system 1900 may include circuitry or other specialized hardware for carrying out some or all aspects of the processes. In some operational settings, computing system 1900 may be configured as a system that includes one or more units, each of which is configured to carry out some aspects of the processes either in software, hardware, or some combination thereof.

FIG. 19 depicts computing system 1900 with a number of components that may be used to perform any of the processes described herein. The main system 1902 includes a motherboard 1904 having an I/O section 1906, one or more central processing units (CPU) 1908, and a memory section 1910, which may have a flash memory card 1912 related to it. The I/O section 1906 can be connected to a display 1914, a keyboard and/or another user input (not shown), a disk storage unit 1916, and a media drive unit 1918. The media drive unit 1918 can read/write a computer-readable medium 1920, which can contain programs 1922 and/or databases. Computing system 1900 can include a web browser. Moreover, it is noted that computing system 1900 can be configured to include additional systems in order to fulfill various functionalities. Computing system 1900 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine-accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed by this United States patent:

1. A computerized method for minimizing a data governance in order to improve data security, comprising:

providing and imposing a set of access rules to a set of data, wherein the set of data is stored in a data warehouse;

measuring a level of over provisioning of users or roles with access to the set of data;

measuring a level of data abuse susceptibility of the set of data;

implementing a dark data governance operation on the set of data; and identifying a set of infrequently used roles in the set of data.

2. The computerized method of claim 1, wherein the set of access rules stipulate that only specific roles can access a clear text data as long as the data does not have personally identifiable information and is not exposed publicly.

3. The computerized method of claim 2, wherein providing and imposing the set of access rules to the set of data further comprises:

imposing a set of principles of least privilege based on granted versus configured user access.

4. The computerized method of claim 2, wherein providing and imposing the set of access rules to the set of data further comprises:

imposing principles of least privilege based on granted versus configured role privileges.

5. The computerized method of claim 2, wherein providing and imposing the set of access rules to the set of data further comprises:

tracking columnar usage and imposing columnar access controls.

6. The computerized method of claim 2, wherein providing and imposing the set of access rules to the set of data further comprises:

imposing masked data access for human users by default.

7. The computerized method of claim 1, wherein measuring a level of over provisioning of the set of data further comprises:

measuring a level of over-provisioned users and roles.

8. The computerized method of claim 1, wherein measuring a level of over provisioning of the set of data further comprises:

creating a list of users that have access to the set of data and that do not use or do not need access to the set of data.

9. The computerized method of claim 8, wherein measuring a level of over provisioning of the set of data further comprises:

restricting users from accessing the set of data.

10. The computerized method of claim 1, wherein dark data of the set of data comprises data that has not been accessed for a specified period of time.

11. The computerized method of claim 10, wherein implementing the dark data governance operation on the set of data further comprises:

restricting access to the dark data of the set of data.

12. The computerized method of claim 1, wherein the set of infrequently used roles comprises a set of user roles that are created but never assigned to any users.

13. The computerized method of claim 12, wherein identifying the set of infrequently used roles in the set of data further comprises:

restricting access of the set of infrequently used roles to the set of data.

14. The computerized method of claim 1, wherein the data warehouse comprises a cloud-data warehouse.

15. A system comprising:

one or more processors; and memory storing instructions that, when executed by the one or more processors, cause the system to:

provide and impose a set of access rules to a set of data, wherein the set of data is stored in a data warehouse;

measure a level of over provisioning of the set of data;

measure a level of data abuse susceptibility of the set of data;

implement a dark data governance operation on the set of data;

identify a set of infrequently used roles in the set of data; and restrict access of the set of infrequently used roles to the set of data.

16. The system of claim 15, wherein the set of access rules stipulate that only specific roles can access clear text data as long as the data does not have personally identifiable information and is not exposed publicly, and wherein providing and imposing the set of access rules further comprises imposing masked data access for human users by default.

17. The system of claim 15, wherein measuring the level of over provisioning of the set of data comprises identifying users configured to access the set of data that are not observed accessing the set of data, and wherein the data warehouse comprises a cloud-data warehouse.

18. One or more non-transitory computer-readable media storing instructions that, when executed by one or more processors, cause the one or more processors to:

provide and impose a set of access rules to a set of data, wherein the set of data is stored in a data warehouse;

measure a level of over provisioning of the set of data;

measure a level of data abuse susceptibility of the set of data;

implement a dark data governance operation on the set of data;

identify a set of infrequently used roles in the set of data; and restrict access of the set of infrequently used roles to the set of data.

19. The one or more non-transitory computer-readable media of claim 18, wherein the set of infrequently used roles comprises a set of user roles that are created but not assigned to any users.

20. The one or more non-transitory computer-readable media of claim 18, wherein the dark data of the set of data comprises data that has not been accessed for a configurable specified period of time, and wherein the instructions further cause the one or more processors to restrict access to the dark data of the set of data.

* * * * *